United States Patent
Tanaka et al.

(10) Patent No.: US 6,927,941 B1
(45) Date of Patent: Aug. 9, 2005

(54) DISK DRIVE DISK WITH LANDING ZONE HAVING TEXTURED AND UNTEXTURED REGIONS

(75) Inventors: Hidetsugu Tanaka, Yamato (JP);
Yoshio Yamamoto, Machida (JP);
Yoshinao Harada, Chigasaki (JP);
Takao Chikazawa, Fujisawa (JP)

(73) Assignee: Hitachi Global Storage Technologies Netherlands BV (NL)

( * ) Notice: Subject to any disclaimer, the term of this patent is extended or adjusted under 35 U.S.C. 154(b) by 1075 days.

(21) Appl. No.: 09/049,861

(22) Filed: Mar. 27, 1998

(30) Foreign Application Priority Data

Mar. 28, 1997 (JP) .............................. 9-077251

(51) Int. Cl.[7] .................................. G11B 5/82
(52) U.S. Cl. ...................................... 360/135
(58) Field of Search .................... 360/135; 428/65.3

(56) References Cited

U.S. PATENT DOCUMENTS

| | | | | |
|---|---|---|---|---|
| 4,698,251 A | * | 10/1987 | Fukuda et al. | 360/135 |
| 4,996,622 A | * | 2/1991 | Takatsuki et al. | 360/135 |
| 5,635,269 A | * | 6/1997 | Weir et al. | 360/135 |

FOREIGN PATENT DOCUMENTS

| | | |
|---|---|---|
| JP | 56-35 | 11/1979 |
| JP | 63-239618 | 3/1987 |
| JP | 4-38716 | * 2/1992 |
| JP | 5-307748 | * 11/1993 |
| JP | 6-111294 | * 4/1994 |
| JP | 6-290452 | * 10/1994 |
| JP | 07-302476 | 11/1995 |
| JP | 08-77554 | 3/1996 |

* cited by examiner

*Primary Examiner*—David Davis
(74) *Attorney, Agent, or Firm*—Crawford Maunu PLLC

(57) ABSTRACT

A disk storage medium and a disk drive which reduce friction during landing of the head/slider is described. The minimum fly height area of the head/slider is positioned over a texture free portion of the landing zone on the disk surface landing. In a preferred embodiment, the landing zone of a magnetic disk is a laser texture zone comprising a great number of bumps and is positioned during landing adjacent an area other than the minimum fly height area of the head/slider. The area facing the minimum fly height area of a head/slider has no bumps, i.e. is a bump free zone.

3 Claims, 9 Drawing Sheets

[Figure 1]
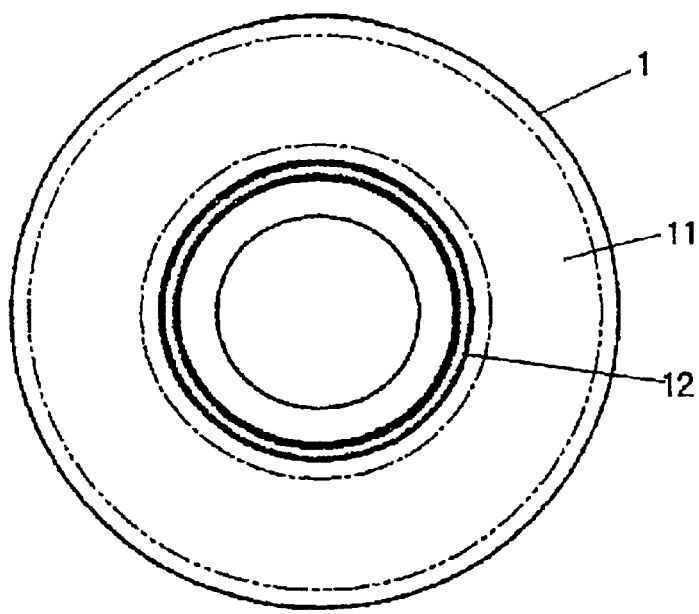
[Figure 2]
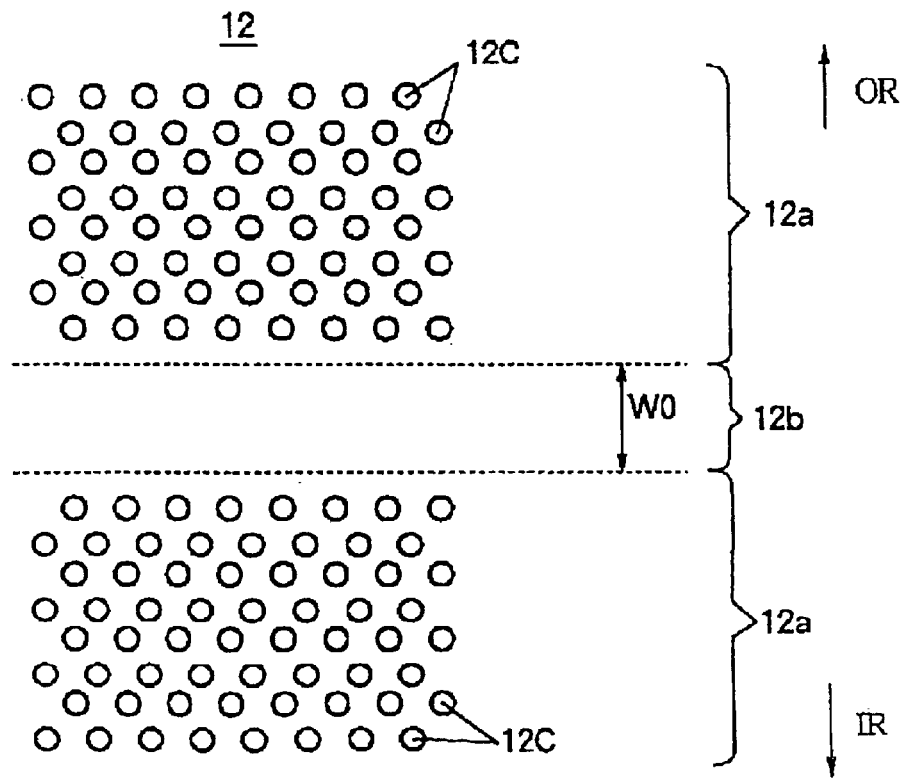

[Figure 3]
(A)
(B)
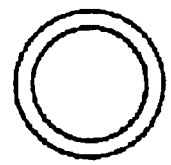
[Figure 4]
(A)
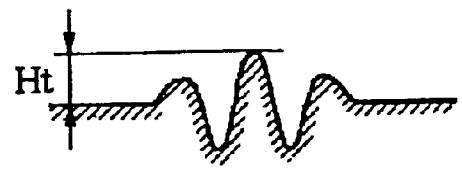
(B)
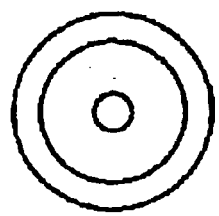

[Figure 5]
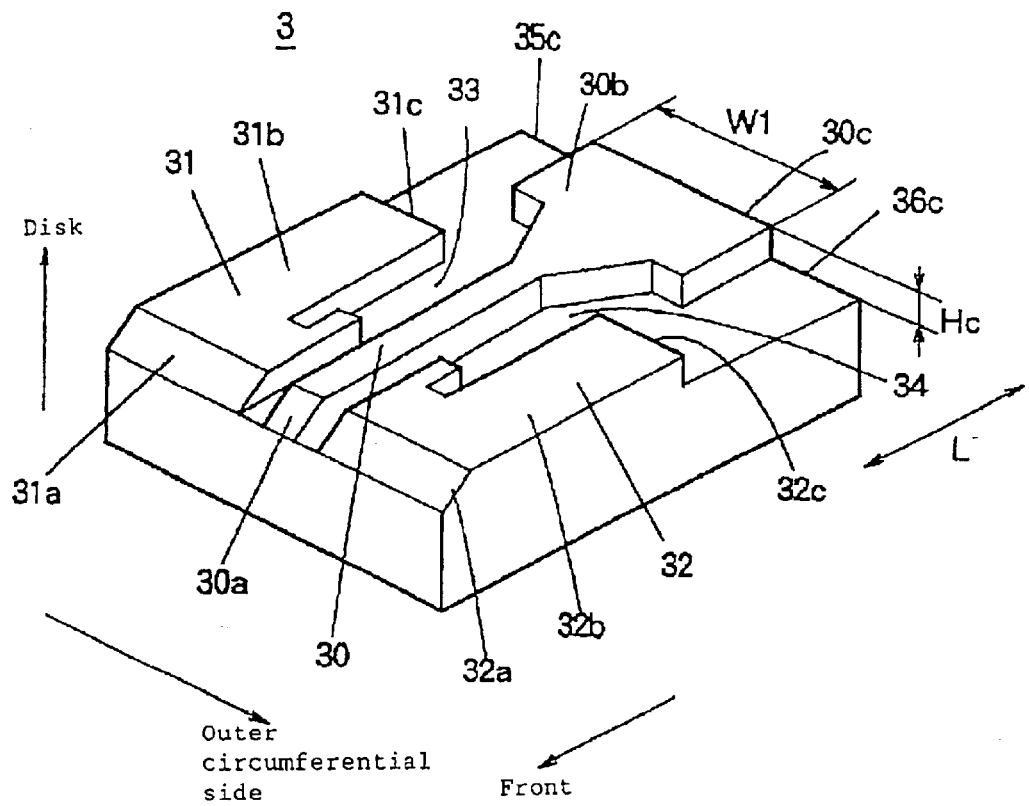
[Figure 6]
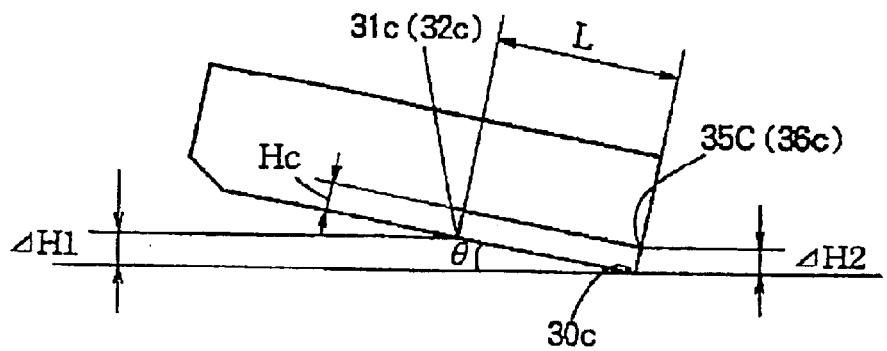

[Figure 7]
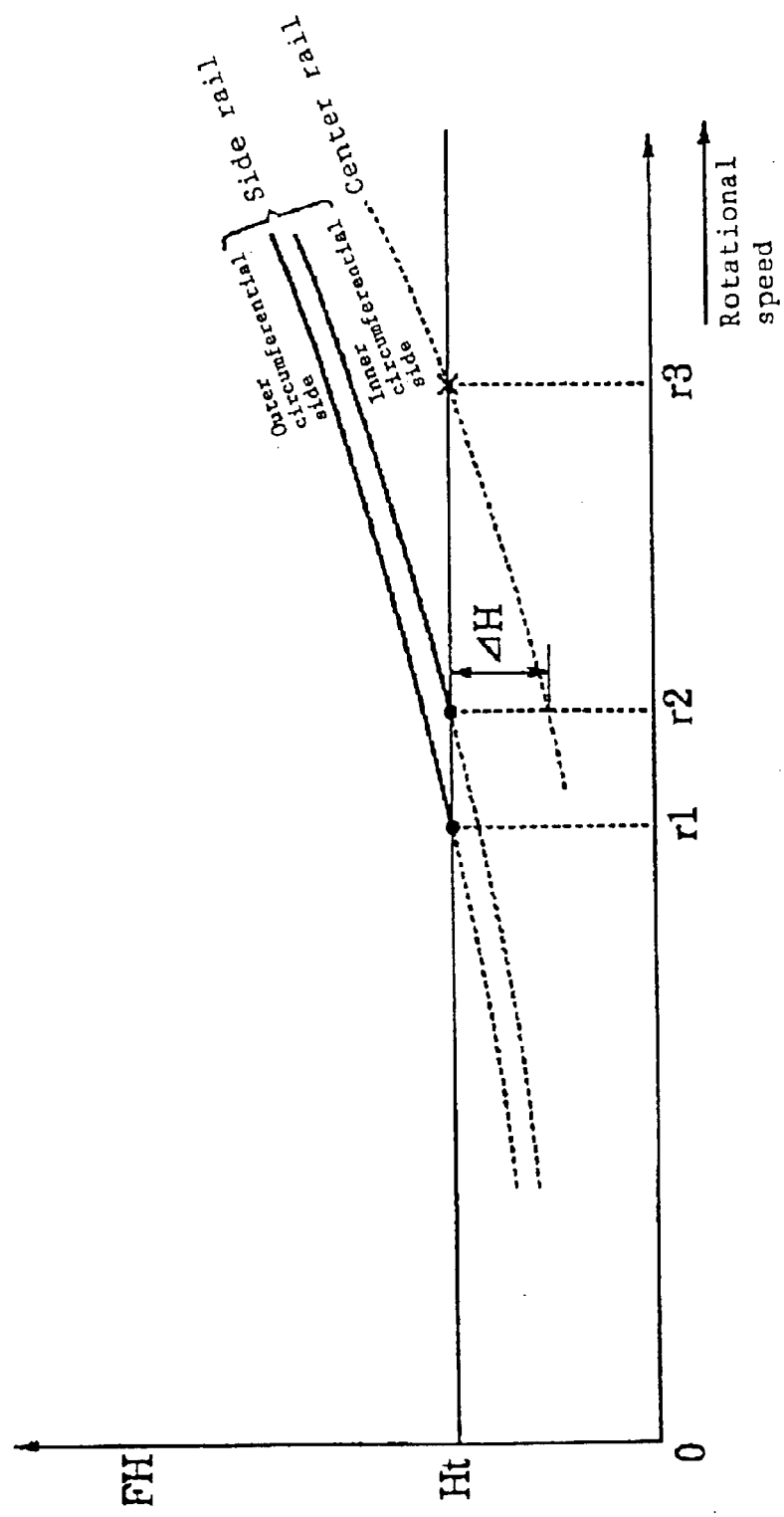

[Figure 8]
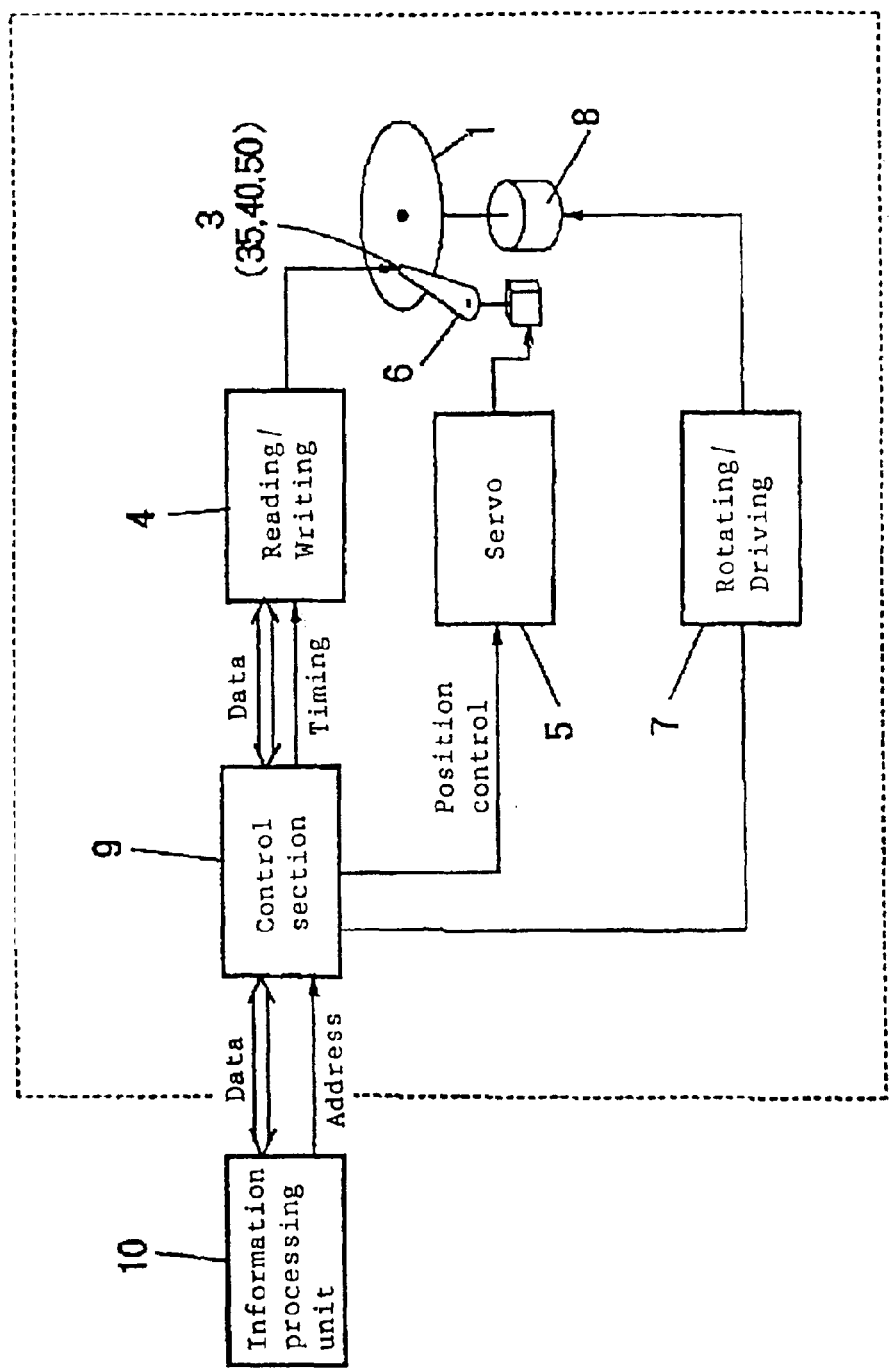

[Figure 9]
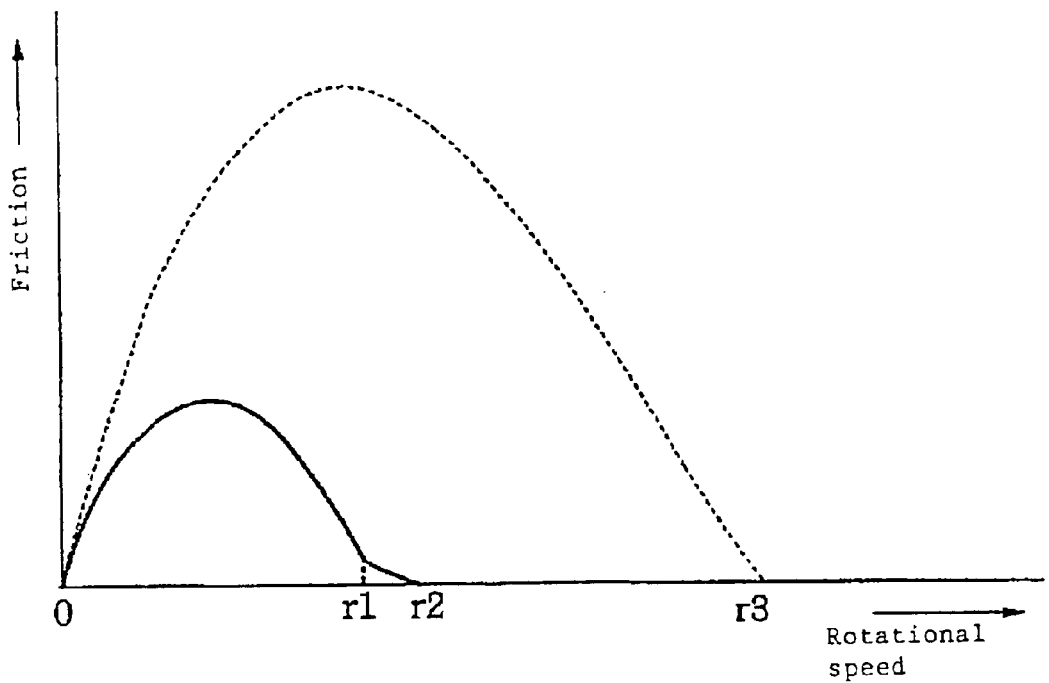
[Figure 10]
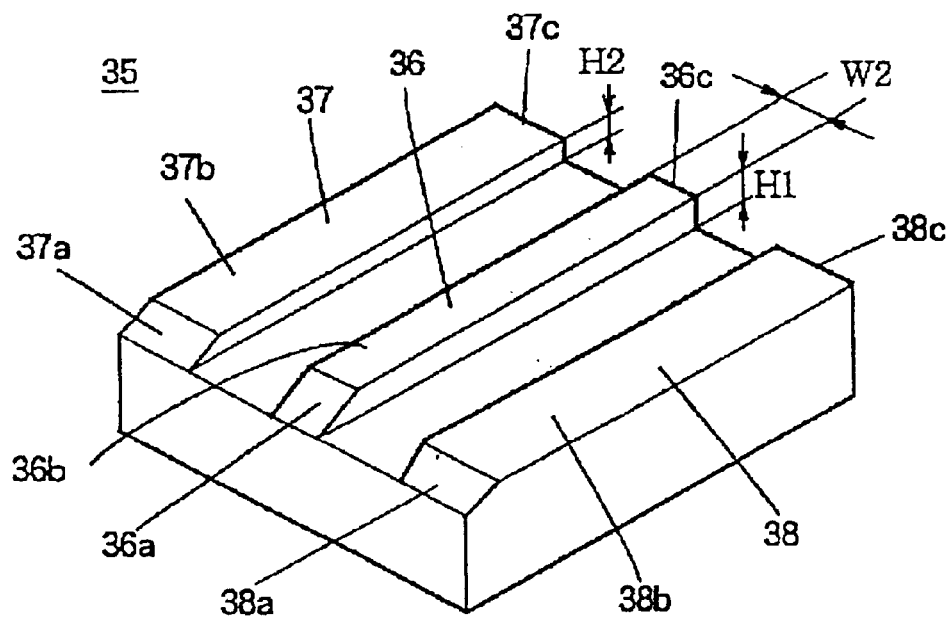

[Figure 11]
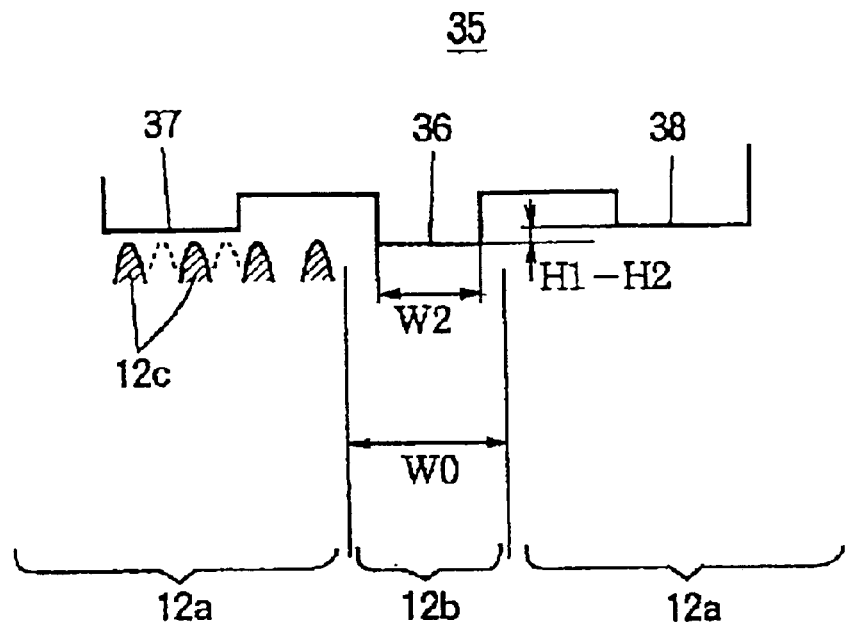
[Figure 12]
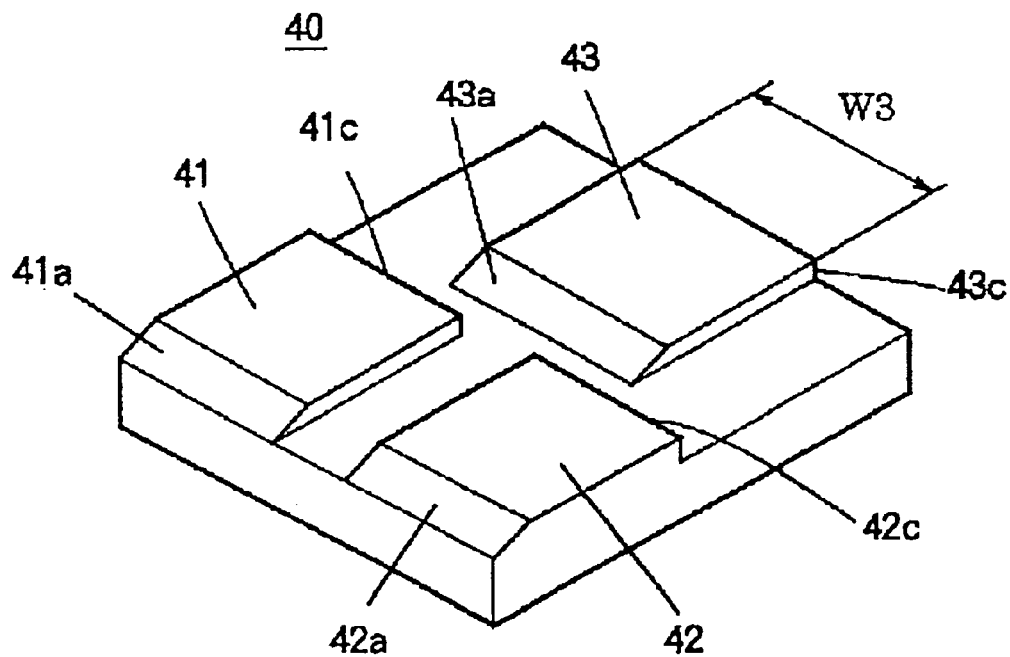

[Figure 13]
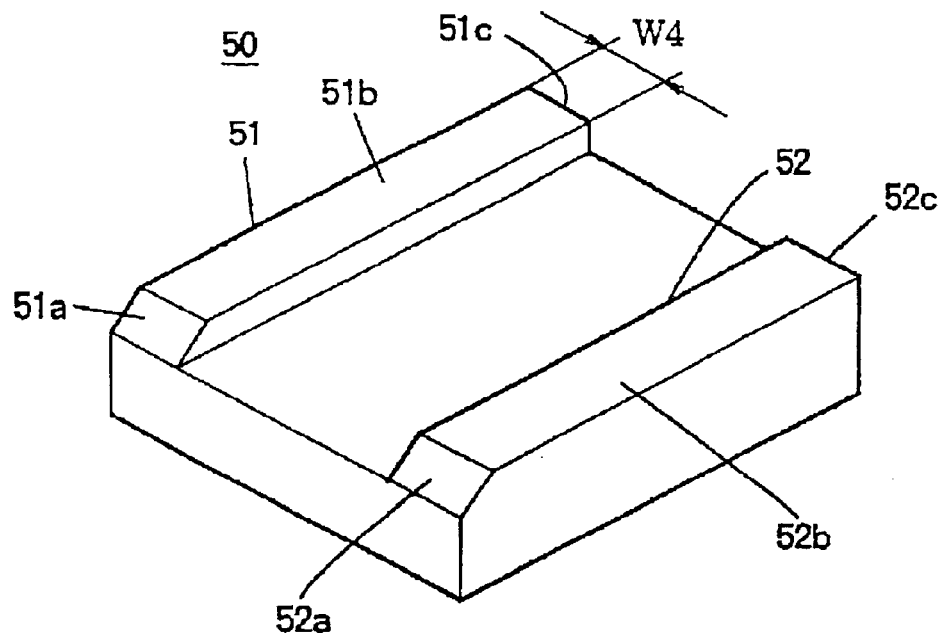
[Figure 14]
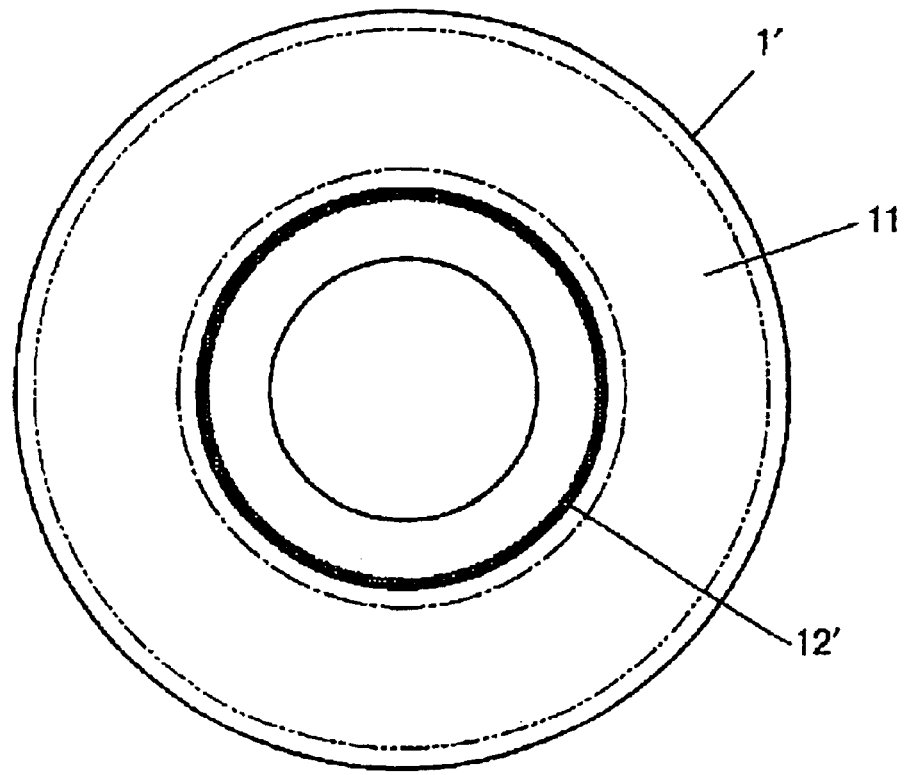

[Figure 15]
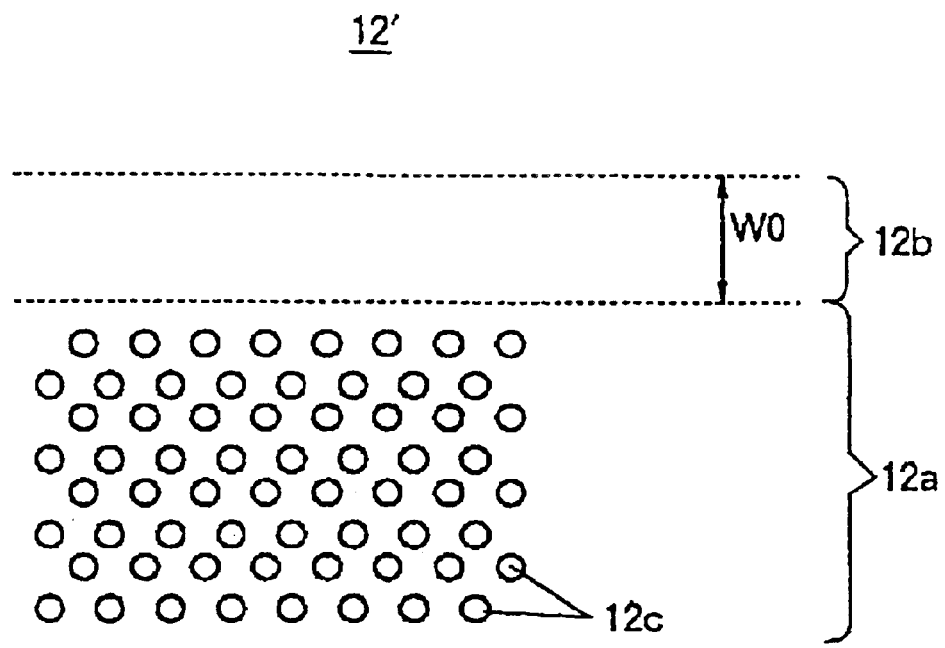

DISK DRIVE DISK WITH LANDING ZONE HAVING TEXTURED AND UNTEXTURED REGIONS

FIELD OF THE INVENTION

The present invention relates to a disk storage medium with an area for landing a head/slider. More particularly, the invention relates to a disk storage medium and a disk drive where the friction during landing is reduced.

BACKGROUND OF THE INVENTION

In a contact start stop (CSS) type disk drive, the head/slider in contact with the surface of the magnetic disk during stop of the magnetic disk is floated, as the magnetic disk is rotated.

The magnetic transducers (which are also called heads) for reading and writing on the magnetic media are conventionally packaged in a block of material and the entire package is called a slider. The unit which contains the transducers however packaged will be referred to herein as a head/slider. The bottom surface of the head/slider (on the side of the magnetic disk) is provided with an air bearing surface (ABS). If the rotational speed of the magnetic disk reaches a predetermined rotational speed or more, the head/slider will be floated off the disk surface against the urging force of the actuator arm by the viscosity of air that flows between the air bearing surface and the disk surface.

A magnetic disk and a head/slider such as this perform reading/writing without touching each other, thereby preventing damage to the magnetic disk surface and the head/slider.

Incidentally, where an attempt is made to enhance the recording density of a magnetic disk, it is required to smooth the surface of the magnetic disk. However, if the magnetic disk surface becomes smooth, the head/slider will show a marked tendency to stick to the magnetic disk surface when the rotation of the magnetic disk is stopped. If the head/slider sticks to the disk surface, a large torque will be required to rotate the magnetic disk and sometimes it will damage the magnetic disk surface.

For this reason, magnetic disks are provided with a circumferential area where the head/slider lands, i.e. a landing zone, where the disk surface is roughened to prevent the sticking of the head/slider. A magnetic disk such as this is disclosed, for example, in Japanese Published Unexamined Patent Application Nos. 4-38716, 5-307748, 6-111294, and 6-290452.

In Published Unexamined Patent Application No. 4-38716, concentric, circular grooves or a spiral groove is formed on a landing zone by injecting particles mixed with high-pressure gas onto a magnetic disk. In Published Unexamined Patent Application No. 5-307748, a great number of bumps having no acute angle are formed on the landing zone (head parking zone) on the surface of a magnetic disk. In Published unexamined Patent Application No. 6-111294, a great number of protruding patterns are formed on a landing zone (in which a magnetic head performs touching and sliding) by photolithography. In Published Unexamined Patent Application No. 6-290452, a great number of cavities are formed on a landing zone by irradiating laser light to a carbon substrate.

In the disk drive employing a magnetic disk provided with the landing zone, the head/slider is moved onto the landing zone during landing, thereby effectively preventing the sticking of the head/slider to the disk surface when the head/slider is landed or started or when the magnetic disk is rotated.

However, from the standpoint of long-term reliability in a disk drive, the texture on the landing zone has room for improvement in that the possibility of damage to the texture by friction during landing or damage to the magnetic disk surface and head by broken pieces is undeniable. Also, there is room for improvement in that the possibility of damage to the magnetic head by friction during landing is undeniable over a long time.

SUMMARY OF THE INVENTION

Accordingly, it is the object of the present invention to provide a disk storage medium and a disk drive which reduce friction during landing and are high in reliability.

In a disk storage medium according to the present invention, in order to reduce friction when a head/slider is landed, the circumferential area where the head/slider lands, i.e. the landing zone, on a disk is provided with a ring-shaped free zone which faces a minimum fly height area of the head/slider which is lowest in fly height among the air bearing surfaces, and also the landing zone is provided with a ring-shaped bump zone adjacent to the free zone. The bump zone is formed with bumps and the free zone has no bumps.

The bumps may also comprise laser bumps formed by irradiating the disk substrate with laser light. The bump zone may also be provided on both the inner circumferential side and the outer circumferential side of the free zone.

A disk drive according to the present invention, in order to reduce friction when a head/slider is landed, is equipped with a disk storage medium having a ring-shaped free zone which faces a minimum fly height area of the head/slider which is lowest in fly height among the air bearing surfaces and also having a ring-shaped bump zone adjacent to the free zone. The bump zone is formed with bumps protruding from the surface of the disk substrate, and the free zone has no bumps. Furthermore, the disk drive is equipped with a landing position control unit for moving the head/slider so that the minimum fly height area of the head/slider is positioned over the free zone of the disk storage medium when landing the head/slider.

BRIEF DESCRIPTION OF THE DRAWINGS

FIG. 1 is a diagram showing the constitution of a magnetic disk according to one embodiment of this invention;

FIG. 2 is an enlarged view showing the structure of the landing zone of the magnetic disk;

FIG. 3 is a diagram showing an example of the sectional configuration of the individual bumps constituting the laser zone texture of the landing zone;

FIG. 4 is a diagram showing another example of the sectional configuration of the individual bumps constituting the laser zone texture of the landing zone;

FIG. 5 is a diagram showing an example of the configuration of the air bearing surface of the head/slider;

FIG. 6 is a diagram showing the pitching angle of the head/slider during landing;

FIG. 7 is a diagram showing the rotational speed of the magnetic disk and the fly height of each portion of the head/slider;

FIG. 8 is a diagram showing the constitution of a disk drive according to one embodiment of this invention;

FIG. 9 is a diagram showing the rotational speed of the magnetic disk during landing and the frictional force that the head/slider undergoes;

FIG. 10 is a diagram showing another example of the configuration of the air bearing surface of the head/slider;

FIG. 11 is a diagram showing the relationship between the air bearing surface of the head/slider and the bump;

FIG. 12 is a diagram showing still another example of the configuration of the air bearing surface of the head/slider;

FIG. 13 is a diagram showing yet another example of the configuration of the air bearing surface of the head/slider;

FIG. 14 is a diagram showing the constitution of a magnetic disk according to another embodiment of this invention;

FIG. 15 is an enlarged view showing the structure of the landing zone of the magnetic disk according to the embodiment of this invention.

DESCRIPTION OF THE PREFERRED EMBODIMENT

FIG. 1 is a diagram showing the constitution of a magnetic disk 1 according to a first embodiment of the present invention. The magnetic disk 1 is equipped with a storage area 11 on which data is recorded and a landing zone 12 formed on the inner circumferential side of the storage area 11 for landing a magnetic head.

As a portion of the landing zone 12 is shown in FIG. 2, the landing zone 12 has a ring-shaped bump free zone 12b with a width of W0 and two ring-shaped bump zones 12a adjacent to the bump free zone 12b and positioned on the outer radial side OR and inner side IR. The bump zones have laser zone texture (LZT) comprising a great number of bumps 12c formed at predetermined intervals.

Bumps 12c such as described above are formed by spot irradiation with laser light. By forming the bumps 12c by laser irradiation, the control of a zone on which the bumps 12c are formed becomes easy and the control of the configuration and height of the bumps 12c becomes easy. For example, in the magnetic disk described in the prior application (Published Unexamined Patent Application No. 8-9415), the configuration of bumps that are formed is controlled by controlling the irradiation conditions (such as spot diameter and laser power) of laser light during the fabrication. In this way, by controlling laser irradiation conditions, bumps can be formed into a crater type such as that shown in FIG. 3 or a crater type with a central top such as that shown in FIG. 4, and in addition, an average height of bumps can be controlled. Also, by employing the processing apparatus shown in the aforementioned publication, the control of the radial direction of an area on which bumps are formed can easily be performed.

The width W0 of the bump free zone 12b is set in correspondence with the configuration of a head/slider on which a head for performing recording and regeneration with respect to the magnetic disk 1 is mounted. When a head/slider lands on a magnetic disk without a bump free zone, a minimum fly height (MFH) area on the head/slider first touches the bumps then lands. The MFH area means an area where the height between a head/slider and a magnetic disk becomes minimum in the state where the head/slider is floated off the disk (minimum fly height). The bump free zone 12 is provided for preventing this MFH area from touching bumps when landing and for touching another area with the bumps 12c to land a head/slider.

In a disk drive employing the magnetic disc 1 provided with the bump free zone 12b, when landing, the head/slider is moved so that the MFH area of the head/slider is positioned over the bump free zone 12b, and then the rotation of the magnetic disk is stopped. By performing such control of the head/slider, when the fly height is reduced as the rotational speed of the magnetic disk 1 is reduced, there are no bumps 12c which touch the MFH area and therefore an area other than the MFH area touches the bumps 12c and is landed.

It is necessary that the width W0 of the bump free zone 12b be above the width of the MFH area so that the MFH area does not touch the bumps 12c during landing. Furthermore, in fact, since there are errors in the yaw angle and the head seeking system, a margin corresponding to these errors is needed.

Also, it is necessary that the width W0 of the bump free zone 12b be below the width of the head/slider so that the entire head/slider does not fall within the bump free zone 12b during landing.

The magnetic disk 1 shown in FIGS. 1 and 2 has been designed on the assumption that a 3-rail type head/slider 3 with a configuration such as that shown in FIG. 5 is employed. In FIG. 5 the surface, which faces the magnetic disk 1 when used, faces up.

A head/slider 3 is equipped with a center rail 30 provided in the longitudinal direction of the head/slider 3 and side rails 31 and 32 provided in the longitudinal direction on both sides of the center rail 30, at the center portion of the head/slider 3 as air bearing surfaces. The rails 30, 31, and 32 consist of front taper portions 30a, 31a, 32a and flat portions 30b, 31b, and 32b, respectively. During operation, air flows between the flat portions 30b, 31b, and 32b and the magnetic disk surface over the taper portions 30a, 31a, and 32a. With the viscosity of the flowing air, the head/slider 3 floats or flies slightly (a few tens of am or so) off the magnetic disk surface.

Also, between the center rail 30 and the side rail 31 and between the center rail 30 and the side rail 32, negative-pressure pockets 33 and 34 are formed for generating negative pressure and stabilizing the floating of the head/slider 3.

In the head/slider 3 shown in FIG. 5, since the MFH area is the rear end portion 30c of the center rail 30, the width of a margin added to the width W1 of this rear end portion 30c is set to the width W0 of the bump free zone 12b.

When the head/slider 3 is floating, there is a pitching angle $\theta$ as shown in FIG. 6 and therefore the fly heights of the rear end portions 31c and 32c of the side rails 31 and 32 are varied according to this pitching angle $\theta$. The difference $\Delta H1$ between the fly height of the rear end portions 31c and 32c of the side rails 31 and 32 and the fly height of the rear end portion 30c of the center rail 30 is expressed by $L \sin \theta$ where L is the distance between the rear end portions 31c and 32c of the side rails 31 and 32 and the rear end portion 30c of the center rail 30.

If the height of the bumps 12c is higher than $\Delta H1$, the rear end portion 30c of the center rail 30 will never touch the surface of the bump free zone 12b during landing, because the rear end portions 31c and 32c of the side rails 31 and 32 touch the bumps 12c before the fly height of the rear end portion 30c of the center rail 30 becomes 0. Therefore, the height Ht of the bumps 12c will be sufficient if it is higher than $\Delta H1$ ($=L \sin \theta$).

FIG. 7 shows the relationship between the rotational speed of the magnetic disk and the rear end portions 30c of the center rail 30, 31c, and 32c of the center and side rails 31, and 32 in the case where the head/slider 3 with a configuration such as described above is employed. In FIG. 7 there is shown the case where the height Ht of the bumps 12c is above the height Hc of the rear end portion 30c of the center rail 30 (i.e., Ht>ΔH1). In FIG. 7, the fly height of the rear end portion 32c of the outer side rail 32 has become higher than that of the rear end portion 31c of the inner side rail 31 due to the fact that the flow of air is faster on the outer circumferential side of the magnetic disk 1 than on the inner circumferential side.

It is found from FIG. 7 that the fly height of the rear end portion 30c of the center rail 30 becomes equal to the bump height Ht when the rotational speed of the magnetic disk reaches r3. It is also found that the fly height of the rear end portion 31c of the inner side rail 31 becomes equal to the bump height Ht when the rotational speed of the magnetic disk reaches r2 and that the fly height of the rear end portion 32c of the outer side rail 32 becomes equal to the bump height Ht when the rotational speed of the magnetic disk reaches r1. From a difference in fly height between the rear end portions shown in FIG. 7, there are obtained parameters, such as a pitching angle θ, for the fly posture of the head/slider.

It is also found from FIG. 7 that even when the fly height of the rear end portion 31c of the inner side rail 31 is reduced down to the bump height Ht, the fly height of the rear end portion 30 of the center rail 30 has not become 0. The difference in fly height at this time is equivalent to the aforementioned difference ΔH1 (=L sin θ). Assume that the head/slider lands at a nearly constant pitching angle. At this time, in order for the rear end portion 31c of the inner side rail 31 to touch the bumps 12c prior to the rear end portion 30c of the center rail 30, it will be sufficient if the bump height Ht is above ΔH1.

The magnetic disk of the aforementioned constitution is employed, for example, in a disk drive with constitution such as that shown in FIG. 8. This disk drive is equipped with the aforementioned magnetic disk 1 shown in FIGS. 1 and 2 and the head/slider 3 shown in FIG. 5 and differs other general disk drives in that the position control of the head/slider 3 by a control section 9 during a landing operation is unique.

In the disk drive of such constitution, when landing the head/slider, the control section 9 first controls a servo system 5 and an actuator 6 to move the head/slider 3 so that the center rail 30 is positioned over the bump free zone 12b.

Thereafter, the control section 9 controls a rotating/driving section 7 to stop a motor 8, thereby stopping the rotation of the magnetic disk 1. With this control, if the rotational speed of the magnetic disk 1 is gradually reduced, the fly height of the head/slider 3 is gradually reduced as shown in FIG. 7. Since the magnetic disk 1 is provided with the bump free zone 12, even if the rotational speed were reduced to less than r3 in FIG. 7, the rear end portion 30c of the center rail 30 would never touch the bumps 12c nor the surface of the bump free zone 12b. When the rotational speed reaches r2, the rear end portion 31c of the inner side rail 31 first touches the bumps 12c on the inner circumferential side of the bump free zone 12b. If the rotational speed is further reduced to r1, the rear end portion 32c of the outer side rail 32 will touch the bumps 12c on the outer circumferential side of the bump free zone 12b and land. The friction that the head/slider 3 undergoes during such landing will be as shown by a solid line in FIG. 9.

More specifically, as the rotational speed of the magnetic disk 1 is gradually reduced, the rear end portion 31c of the inner side rail 31 begins to touch the bumps 12c when the rotational speed reaches r2, and therefore the friction is gradually increased. When the rotational speed reaches r1, the rear end portion 32c of the outer side rail 32 begins to touch 15 the bumps 12c and therefore the friction is further increased, but thereafter, the friction is reduced as the rotational speed is reduced.

As described above, it is known that conventional magnetic disks are equipped at a predetermined area (generally a ring-shaped area on the inner circumferential side of the storage area) with a landing zone where the surface of the magnetic disk is roughened.

However, these conventional magnetic disks are not provided with bump free zone, as in FIGS. 1 and 2. It is now assumed that a disk drive employing these conventional magnetic disks has the same bump height Ht and the same fly characteristic of the head/slider 3 as FIG. 7. When the head/slider 3 is landed, the rear end portion 30c of the center rail 30 first touches bumps at the time that the rotational speed of the magnetic disk has reached r3. Then, when the rotational speed of the magnetic disk reaches r2, the rear end portion 31c of the inner side rail 31 touches bumps and lands. Furthermore, when the rotational speed of the magnetic disk reaches r1, the rear end portion 32c of the outer side rail 32 touches bumps and lands. When such landing is performed, the friction that the head/slider 3 undergoes will become as shown by a broken line in FIG. 9.

More specifically, as the rotational speed of the magnetic disk 1 is gradually reduced, the rear end portion 30c of the center rail 30 begins to touch the bumps 12c when the rotational speed reaches r3, and therefore the friction is gradually increased. When the rotational speed reaches r2, the rear end portion 31c of the inner side rail 31 begins to touch the bumps 12c and therefore the friction is further increased. When the rotational speed reaches r1, the rear end portion 32c of the outer side rail 32 begins to touch the bumps 12c and therefore the friction is even further increased, but thereafter, the friction is reduced as the rotational speed is reduced.

The foregoing description has been made on the assumption that the rear end portions 31c and 32c of the side rails 31 and 32 first touch the bumps 12c due to the fly height difference ΔH1 between the rear end portion 30c of the center rail 30 and the rear end portions 31c and 32c of the side rails 31 and 32. Depending upon the values of Hc and θ, there are cases where the right and left rear end portions 35c and 36c of the head/slider 3 first touch the bumps 12c prior to the rear end portions 31c and 32c of the side rails 31 and 32. Even in this case, when landing, the touch between the head/slider and the bumps 12c is likewise performed in stages and the friction can be reduced as a whole. The condition for avoiding the touching of the rear end portion 30c of the center rail 30 with the bumps 12c by the right and left rear end portions 35c and 36c of the head/slider 3 is Ht>Hc cos θ(=ΔH2).

As described above, by providing the bump free zone 12b in correspondence with the configuration of the head/slider 3, the head/slider 3 can be landed at the time that the rotational speed of the magnetic disk has reached a relatively low speed in comparison with the conventional magnetic disk having no bump free zone. In this way, by reducing the rotational speed of the magnetic disk during landing, the friction that the head/slider undergoes can be reduced.

It is believed that the probability that damage to the bumps or the head/slider arises is correlated with the friction between the head/slider and the magnetic disk. Therefore, by reducing the friction that the head/slider undergoes, the probability that damage to the bumps or the head/slider arises is reduced, and consequently, the reliability of a disk drive employing such a magnetic disk can be enhanced.

The magnetic disk 1 shown in FIGS. 1 and 2 can be employed in a 3-rail type head/slider with a configuration shown in FIGS. 10 and 11 or an island type head/slider with a configuration shown in FIG. 12 or a 2-rail type head/slider with a configuration shown in FIG. 13, by adjusting the width W0 of the bump free zone 12b.

The 3-rail type head/slider 35 shown in FIG. 10 is equipped with a center rail 36 and side rails 37 and 38 extending in the longitudinal direction of the head/slider 35, as air bearing surfaces. These rails 36, 37, and 38 comprise front taper portions 36a, 37a, and 38a and flat portions 36b, 37b, and 38b, respectively. (The center rail 36, as shown in FIG. 11, is slightly higher than the height of the side rails 37 and 38.)

In the fly heights of these rails 36, 37, and 38, the rear end portion 36c of the center rail 36 is lowest, then the rear end portion 37c of the inner side rail 37 is lower, and the rear end portion 38c of the outer side rail 38 is highest among the rear end portions 36c, 37c, and 38c of these rails 36, 37, and 38. Therefore, the MFH area of the head/slider 35 with such a configuration is the rear end portion 36c of the center rail 36. For this reason, the width W0 of the bump free zone 12b will suffice if it is wider than a margin added to the width W2 of the rear end portion 36c of the center rail 36.

When landing, as with the aforementioned, the head/slider 36 is moved so that the center rail 36 is positioned over the bump free zone 12b. The fly heights of the rear end portions 36c, 37c, and 38c of the rails vary in the same way as FIG. 7 in accordance with the rotational speed of the magnetic head. However, in the 3-rail type head/slider 35, the fly height of the rear end portion 36c of the center rail 36 is slightly lower than FIG. 7. Also, since the rear end portions 37c and 38c of the side rails 37 and 38 reach the rear end of the head/slider 35, these fly heights are also slightly slower than FIG. 7.

As the rotational speed of the magnetic disk 1 is reduced, the fly height of the rear end portion 36c of the center rail 36 first becomes equal to the height of the bumps 12c. However, since there is provided the bump free zone 12b, the rear end portion 36c of the center rail 36 never touches the bumps 12c. Then, the rear end portion 37c of the inner side rail 37 touches the bumps 12c on the inner circumferential side of the bump free zone 12b. Next, the rear end portion 38c of the outer side rail 38 touches the bumps 12c on the outer circumferential side of the bump free zone 12b and is landed.

In a conventional magnetic disk with no bump free zone 12b, the rear end portion 36c of the center rail 36 first touches bumps then lands. From FIG. 7 the rotational speed of the magnetic disk at this time is higher than the rotational speed at which the rear end portion 37c of the inner side rail 37 touches bumps. Therefore, by providing the bump free zone 12b, the head/slider can land at the time that the rotational speed of the magnetic disk has reached a relatively lower speed in comparison with the conventional disk having no bump free zone. With this arrangement, the friction during landing can be reduced.

The island type head/slider 40 shown in FIG. 12 is equipped with side rails 41 and 42 provided on both sides in front of the air bearing surface and a rear rail 43 provided on the rear central side of the air bearing surface. These rails 41, 42, and 43 comprise front taper portions 41a, 42a, and 43a and flat portions 41b, 42b, and 43b, respectively.

In the fly heights of the rails 41, 42, and 43, the rear end portion 43c of the rear rail 43 is lowest, then the rear end portion 41c of the inner side rail 41c is lower, and the rear end portion 42c of the outer side rail 42 is highest among the rear end portions 41c, 42c, and 43c of these rails 41, 42, and 43. Therefore, the MFH area of the head/slider 40 with such a configuration is the rear end portion 43c of the rear rail 43. Therefore, the width W0 of the bump free zone 12b will suffice if it is wider than a margin added to the width W3 of the rear end portion 43c of the rear rail 43.

When landed, the head/slider 40 is moved so that the rear rail 43 is positioned over the bump free zone 12b. For this reason, even if the fly height were reduced, the rear end portion 43c of the rear rail 43 would never touch the bumps 12c. Therefore, as the rotational speed of the magnetic disk 1 is reduced, the rear end portion 41c of the inner side rail 41 first touches the bumps 12c on the inner circumferential side of the bump free zone 12b. Then, the rear end portion 42c of the outer side rail 42 touches the bumps 12c on the outer circumferential side of the bump free zone 12b and is landed.

In a conventional magnetic disk with no bump free zone 12b, the rear end portion 43c of the rear rail 43 first touches bumps. The rotational speed of the magnetic disk at this time is higher than the rotational speed at which the rear end portion 41c of the inner side rail 41 touches bumps. Therefore, as described above, by providing the bump free zone 12b, the head/slider can be landed at the time that the rotational speed of the magnetic disk has reached a relatively lower speed in comparison with the conventional disk having no bump free zone. With this arrangement, the frictional force during landing can be reduced.

The 2-rail type head/slider 50 shown in FIG. 13 is equipped with side rails 51 and 52 extending in the longitudinal direction of the head/slider 50 as air bearing surfaces. These side rails 51 and 52 comprise front taper portions 51a and 52a and flat portions 51b and 52b, respectively.

The fly height of the rear end portion 51c of the inner side rail 51 is usually lower than that of the rear end portion 52c of the outer side rail 52. Therefore, in this case the MFH area of the head/slider 52 is the rear end portion 51c of the inner side rail 51.

For this reason, the width W0 of the bump free zone 12b will suffice if it is wider than a margin added to the width W4 of the rear end portion 51c of the inner side rail 51.

When landed, as with the aforementioned center rail, the head/slider 50 is moved so that the inner side rail 51 is positioned over the bump free zone 12b. The fly heights of the rear end portions 51c and 52c of the side rails 51 and 52 vary in the same way as the fly heights of the side rails of the 3-rail type shown in FIG. 7 in accordance with the rotational speed of the magnetic head.

Since the inner side rail 51, as described above, has been positioned over the bump free zone 12b, the rear end portion 51c of the inner side rail 51 would not touch the bumps 12c even if the fly height were reduced. Therefore, as the rotational speed of the magnetic disk 1 is reduced, the rear end portion 52c of the outer side rail 52 touches the bumps 12c on the outer circumferential side of the bump free zone 12b and is landed.

In a conventional magnetic disk with no bump free zone 12b, the rear end portion 51c of the inner side rail 51 first touches bumps and is landed. From FIG. 7, the rotational speed of the magnetic disk at this time is higher than the rotational speed at which the rear end portion 52c of the outer side rail 52 touches bumps. Therefore, by providing the bump free zone 12b, the head/slider can be landed at the time that the rotational speed of the magnetic disk has reached a relatively lower speed in comparison with the conventional disk having no bump free zone. With this arrangement, the frictional force during landing can be reduced.

Incidentally, in the aforementioned 2-rail type head/slider 50 shown in FIG. 13, the outer side rail 52 touches the bumps 12c on the outer circumferential side of the bump free zone 12b, thereby performing the landing of the head/slider 50. Therefore, if it has been determined to employ a disk drive employing such a 2-rail type head/slider 50 and if the head/slider 50 is not used widely for various purposes, the laser zone texture 12a on the inner circumferential side of the bump free zone 12b does not have to be formed. In such a case, the bump fabricating process becomes unnecessary and therefore a reduction in the cost can be achieved.

Also, even in the case where the 3-rail type head/sliders 3 and 35 shown in FIGS. 5 through 10 or the island type head/slider 40 shown in FIG. 12 is employed, the laser zone texture 12a on the inner circumferential side of the bump free zone 12b is not needed in the case where landing is performed only by the side rails 32 and 38 or the outer side rail 42.

Therefore, in a magnetic disk according to a second embodiment of the present invention, as shown in FIGS. 14 and 15, laser zone texture 12a is formed only on one side of the bump free zone 12b.

The width W0 of the bump free zone 12, as with the aforementioned first embodiment, is determined according to the width of the MFH area of the head/slider.

In a disk drive employing a magnetic disk 1' with the aforementioned constitution, when landing, the position of the head/slider is controlled so that the MFH area of the head/slider is positioned over the bump free zone 12b.

With the aforementioned control, the head/slider can be landed in the state where the area other than the MFH area among the air bearing surfaces of the head/slider touches the bumps 12c of the laser zone texture 12a.

In the magnetic disk 1', the head/slider can be landed in the state where the MFH area of the head/slider is positioned over the bump free zone 12b. Therefore, as with the aforementioned first embodiment, the head/slider can be landed after the magnetic head 1' has reached a relatively low rotational speed. This can reduce the friction during landing and contribute to an enhancement in the reliability of the disk drive.

As in the aforementioned embodiments, the frictional force during landing can be reliably reduced by forming bumps with a method which has a better selectivity of an area on which bumps are formed.

In the aforementioned embodiment, while a description has been made of the case where the laser zone texture 12a is formed only on the outer circumferential side of the bump free zone 12b, the laser zone texture 12a may also be formed only on the inner circumferential side of the bump free zone 12b in the case where the MFH area is formed on the outer circumferential side, depending upon the configuration of a head/slider.

In the aforementioned embodiments, a description has been made of the case where the present invention is applied to the magnetic disk and the disk drive employing the magnetic disk. However, the present invention is not limited to these but it is also applicable, so long as the magnetic disk and the disk drive are a disk storage medium and a contact start stop type disk drive employing the disk storage medium. By applying the present invention to a disk drive such as this, advantages similar to the aforementioned are obtainable.

In the disk storage medium according to the present invention and the disk drive according to the present invention, when the head/slider is landed, the minimum fly height area of the head/slider is moved over the bump free zone, then the area other than the minimum fly height area of the air bearing surface of the head/slider touches bumps and is landed. Therefore, the head/slider can be landed after the magnetic head has reached a relatively low rotational speed, and the frictional force that the head/slider undergoes can be reduced. This can contribute to an enhancement in the reliability of the disk drive.

We claim:

1. A disk drive comprising:

a head/slider having an air bearing surface for floating a slider over a rotating disk;

the disk having a disk substrate, a storage medium on at least a portion of a surface of the disk, the storage medium having a storage area for recording data, the disk having a circumferential landing zone on an area of the disk other than said storage area, the circumferential landing zone being partially textured;

the landing zone having a texture free zone which faces a minimum fly height area of the air bearing surface of the slider when the slider is landing and also having a circumferential bump zone adjacent to said free zone, the bump zone being formed with bumps protruding from the surface of said disk, the free zone having no bumps; and a landing position control unit for moving the slider so that the minimum fly height area of said slider is positioned over the free zone of said disk storage medium when landing said slider;

wherein the bumps have a height above the surface such that the minimum fly height area of the slider does not touch the surface of the disk during landing.

2. A method of operating a disk drive comprising the steps of:

rotating a disk under a slider having an air bearing surface and flying the slider over the disk;

positioning the slider over an area on the disk which includes a textured area and an untextured area with the untextured area being under an area on the air bearing surface having a lowest flying height;

reducing a rotation rate of the disk to allow a portion of the air bearing surface not having the lowest flying height to contact the textured area of the landing zone first; and stopping the disk;

wherein the textured area has a plurality of bumps protruding above a surface of the disk, the bumps having a height above the surface such that the minimum fly height area of the slider does not touch the surface of the disk during landing.

3. The method of claim 2 wherein the bumps have a height above the surface equal to or greater than a difference DHI between a fly height of a rear end portion of a side rail and a fly height of a rear end portion of the center rail.

* * * * *

UNITED STATES PATENT AND TRADEMARK OFFICE
CERTIFICATE OF CORRECTION

PATENT NO.   : 6,927,941 B1
DATED        : August 9, 2005
INVENTOR(S)  : Tanaka et al.

It is certified that error appears in the above-identified patent and that said Letters Patent is hereby corrected as shown below:

<u>Column 4,</u>
Line 35, "am" should read -- aem --.

<u>Column 6,</u>
Line 4, "15" should be deleted after the word "touch".

Signed and Sealed this

Twentieth Day of December, 2005

JON W. DUDAS
*Director of the United States Patent and Trademark Office*